United States Patent
Ko et al.

(10) Patent No.: US 7,383,035 B2
(45) Date of Patent: Jun. 3, 2008

(54) METHOD OF FURNISHING ILLEGAL MOBILE EQUIPMENT USER INFORMATION

(75) Inventors: Hong Gi Ko, Gunpo-shi (KR); Seung Eon Yoon, Anyang-shi (KR)

(73) Assignee: LG Electronics Inc., Seoul (KR)

( * ) Notice: Subject to any disclaimer, the term of this patent is extended or adjusted under 35 U.S.C. 154(b) by 1127 days.

(21) Appl. No.: 10/607,561

(22) Filed: Jun. 27, 2003

(65) Prior Publication Data
US 2004/0005875 A1 Jan. 8, 2004

(30) Foreign Application Priority Data
Jul. 4, 2002 (KR) ............ 10-2002-0038677
Aug. 30, 2002 (KR) ............ 10-2002-0051870

(51) Int. Cl.
*H04M 1/66* (2006.01)

(52) U.S. Cl. ............... 455/410; 455/411

(58) Field of Classification Search ........ 455/405–411, 455/412.2, 435.1, 528; 379/114.14, 118, 379/143, 144.3, 145
See application file for complete search history.

(56) References Cited

U.S. PATENT DOCUMENTS

| | | | | |
|---|---|---|---|---|
| 5,309,501 A | | 5/1994 | Kozik et al. ............. 379/58 |
| 5,625,671 A | * | 4/1997 | Salin ................. 455/411 |
| 5,822,691 A | * | 10/1998 | Hosseini ............. 455/410 |
| 6,091,946 A | * | 7/2000 | Ahvenainen ......... 455/411 |
| 6,148,192 A | | 11/2000 | Ahvenainen ......... 455/410 |
| 6,400,939 B1 | | 6/2002 | Virtanen et al. ....... 455/410 |
| 7,322,041 B2 | * | 1/2008 | Bilgic et al. ........... 726/12 |
| 2001/0053684 A1 | * | 12/2001 | Pirila ................. 455/410 |
| 2003/0033522 A1 | * | 2/2003 | Bilgic et al. ........... 713/168 |
| 2004/0203849 A1 | * | 10/2004 | Allison et al. ........ 455/456.1 |

* cited by examiner

*Primary Examiner*—Binh K. Tieu
(74) *Attorney, Agent, or Firm*—Ked & Associates, LLP

(57) ABSTRACT

A system and method of furnishing illegal mobile equipment user information in a network environment includes obtaining and managing illegal mobile equipment user information through a MAP protocol to thereby prevent a mobile subscriber from illegally using mobile equipment, and tracing illegal mobile equipment through useful information such as user of illegal mobile equipment and a time of use of the illegal mobile equipment. Through this system and method, a mobile communication carrier may flexibly deal with illegal mobile equipment so that competitiveness of goods is heightened and high quality service may be furnished. Furthermore, an EIR that detected illegal mobile equipment usage may transmit illegal mobile equipment user information to Customer Service Billing System, so that immediacy of information may be assured, operator tasks may be reduced, and information may be effectively managed by centralized CSBS.

25 Claims, 5 Drawing Sheets

METHOD OF FURNISHING ILLEGAL MOBILE EQUIPMENT USER INFORMATION

BACKGROUND OF THE INVENTION

1. Field of the Invention

The present invention relates to processing information in a communications system, and more particularly to a system and method of furnishing illegal mobile equipment user information in a mobile communication system including but not limited to one having an International Mobile Telecommunication (IMT) network environment.

2. Background of the Related Art

Communication network environments are increasingly required to furnish network users with reliable and secure service irrespective of the type of communication being provided, e.g., wire communications, wireless communications, voice communications, and/or data communications.

Existing mobile networks provide a security service according to a three-step process: authenticating users trying access to the communication system through an Authentication Center (AUC), checking whether mobile equipment of the user is illegal mobile equipment through an Equipment Identity Register (EIR), and forbidding usage of the illegal mobile equipment when the mobile equipment is determined to be illegal mobile equipment. The manner in which usage of illegal mobile equipment is forbidden will now be explained in greater detail.

Mobile equipment typically includes a unique International Mobile Equipment Identity (IMEI), and an EIR manages status and related information through classifying the IMEI of all mobile equipments into several lists according to specific conditions. These lists include a white list, a black list, and a gray list.

The white list includes IMEIs which have been authenticated in the communication network. The black list includes IMEIs which have not been authenticated or have been designated as illegal, such as an IMEI of stolen mobile equipment or duplicated mobile equipment. The gray list includes IMEIs which require management because of necessities in network operation.

Mobile equipment having an IMEI classified into the black list is not admitted to receive network communication service. In contrast, mobile equipment having an IMEI classified into the white list or the gray list is admitted to receive network communication service. However, the mobile equipment having an IMEI classified into the gray list is managed by being traced by the network.

The EIR manages all IMEIs according to classified lists and furnishes a Mobile Application Part (MAP) protocol message (IMEI request message) received from a switching system (Mobile Switching Center (MSC)/Serving General Packet Radio Service (GPRS) Support Node (SGSN)) with information about service grade of the IMEI.

The MAP protocol message is a message of signaling system No. 7 network used for information exchange between a number of network entities, such as a Home Location Register (HLR), an MSC/SGSN, a Visitor Location Register (VLR), a Base Station (BS), an AUC, an EIR and a Short Message Center (SMC).

Types and parameter configurations of MAP_CHECK_IMEI protocol messages transmitted and received between the MSC/SGSN and EIR in higher rank is explained in greater detail with reference to TABLE 1 below.

TABLE 1

| Parameter Name | Request | Indication | Response | Confirm |
|---|---|---|---|---|
| Invoke id | M | M(=) | M(=) | M(=) |
| IMEI | C | C(=) | C | C(=) |
| Equipment status | | | C | C(=) |
| User error | | | C | C(=) |
| Provider error | | | | O |

In this table, M is a necessary parameter, C is a selective parameter, O is a selective parameter of a service operator, and (=) indicates that the parameter has a same value.

A request message is a MAP protocol message that the MSC/SGSN sends to the EIR to request an IMEI service grade of mobile equipment. An indication message is a request message as viewed from the EIR. A response message is a MAP protocol message that the EIR sends to the MSC/SGSN to inform it of the IMEI service grade of the mobile equipment in response to the request message. And, the confirm message is a response message as viewed from the MSC/SGSN.

FIG. 1 shows steps included in an IMEI information furnishing procedure using the MAP protocol message. According to the 3G technical specification TS 29.002 (GSM 09.02), the EIR receives a MAP_CHECK_IMEI [IMEI] request message including IMEI information of mobile equipment from the MSC/SGSN (S1) and checks whether the mobile equipment is one of which a robbery or loss has been reported, whether the mobile equipment is one which has been illegally duplicated, whether the mobile equipment is not authenticated, etc.

Next, a MAP_CHECK_IMEI [Equipment status] response message including a result of said checking is transmitted to the MSC/SGSN (S2). This message is transmitted to activate the function of preventing a mobile communication subscriber from receiving mobile communication service using illegal mobile equipment. In other words, if the EIR receives a MAP_CHECK_IMEI [IMEI] request message including IMEI information of the mobile equipment from the MSC/SGSN, the EIR checks the received MAP_CHECK_IMEI [IMEI] request message and determines whether an error exists in contents of the message. If the MAP_CHECK_IMEI [IMEI] request message is determined to be a normal message, the EIR inquires of a service grade (white list, black list or gray list) of the IMEI by retrieving information from a database. Then, the EIR transmits the MAP_CHECK_IMEI [Equipment status] response message storing the service grade in mobile equipment status parameter to the MSC/SGSN.

If an error exists in the received MAP_CHECK_IMEI [IMEI] request message and contents of the message (for instance, system shutdown happens or the IMEI included in the message is an unknown IMEI), the EIR transmits a MAP_CHECK_IMEI [User error] response message to the MSC/SGSN (S3).

In a related-art system, a service grade of mobile equipment is checked using a MAP protocol message between an MSC/SGSN and an EIR to prevent a blacklist mobile equipment user from receiving mobile communication service. In performing this function, the MSC/SGSN only requests the IMEI of mobile equipment for purposes of determining service grade and the EIR responds by only providing the requested IMEI of the mobile equipment. Thus, when mobile equipment is determined to be blacklist mobile equipment, there are problems in that the EIR stores meaningless information (such as a final access time of the illegal mobile equipment) which cannot be used as a basis for determining an identity of the illegal mobile equipment user.

The above references are incorporated by reference herein where appropriate for appropriate teachings of additional or alternative details, features and/or technical background.

SUMMARY OF THE INVENTION

An object of the present invention is to provide a system and method for furnishing illegal mobile equipment information which solves one or more of the above-described problems.

Another object of the present invention is to provide a system and method of determining whether equipment is being used illegally in a mobile communication system, by receiving illegal mobile equipment user information from a switching system, storing the information, and notifying an administration system of the mobile equipment's access to the switching system. One or more of these steps may be performed using an EIR.

Another object of the present invention is to transmit illegal mobile equipment user information stored in a security furnishing means to a Customer Service Billing System (CSBS) in the network.

In order to achieve at least the above objects, in whole or part, a first embodiment of the method of the present invention for furnishing illegal mobile equipment user information includes: obtaining illegal mobile equipment user information through service grade inquiry at security furnishing means that received request for service grade of mobile equipment from switching system and storing the information; and reporting the illegal mobile equipment user information to a system operator.

The step of storing the information preferably includes: receiving International Mobile Equipment Identity (IMEI) request message including mobile equipment user information from the switching system; inquiring service grade of the IMEI by retrieving user information database; and in a case where the service grade is classified into illegal IMEI, storing the mobile equipment user information in the user information database.

Another embodiment of the method of the present invention for furnishing illegal mobile equipment user information includes: transmitting IMEI request message including IMEI and user information of mobile equipment from switching system to security furnishing means; inquiring service grade of the IMEI by retrieving user information database at the security furnishing means and transmitting IMEI response message including the service grade to the switching system; and, in a case where the service grade is classified into illegal IMEI, storing the mobile equipment user information in the user information database and reporting the mobile equipment user information to operator.

Preferably, the illegal mobile equipment user information is stored in the user information database of Equipment Identity Register (EIR) furnishing security service.

Preferably, the illegal mobile equipment user information is stored in the user information database of Authentication Center (AUC) furnishing security service.

Preferably, the IMEI request message includes IMEI information, International Mobile Station Identity (IMSI) information and Mobile Subscriber Integrated Service Digital Network (MSISDN) information.

Preferably, the user information database stores IMEI, type of mobile equipment, physical status of mobile equipment, service grade of mobile equipment, first registration time of mobile equipment, access IMSI, access MSISDN, node information and access time information.

Preferably, said storing the information further includes: in a case where the service grade is classified into illegal IMEI, recording the mobile equipment user information in illegal mobile equipment user file.

Preferably, the mobile equipment user information is reported to operator through administration system administrating the switching system.

Preferably, the mobile equipment user information is reported to operator through Customer Service Billing System (CSBS) managing mobile communication network service subscriber.

Preferably, said reporting the information to operator through the CSBS includes: generating illegal mobile equipment access alarm message using the mobile equipment user information; and transmitting the illegal mobile equipment access alarm message to the CSBS.

Preferably, the illegal mobile equipment access alarm message includes IMEI, type of mobile equipment, physical status of mobile equipment, service grade of mobile equipment, first registration time of mobile equipment, access IMSI, access MSISDN, node information and access time information.

More preferably, said reporting the information to operator through the CSBS further includes: in a case where transmission of the illegal mobile equipment access alarm message is failed, transmitting illegal mobile equipment access alarm file to the CSBS.

Preferably, the illegal mobile equipment access alarm file includes IMEI, type of mobile equipment, physical status of mobile equipment, service grade of mobile equipment, first registration time of mobile equipment, access IMSI, access MSISDN, node information and access time information.

More preferably, in a case where transmission of the illegal mobile equipment access alarm message is failed, said transmitting illegal mobile equipment access alarm file to the CSBS includes: generating the illegal mobile equipment access alarm file using the mobile equipment user information; monitoring whether or not message transmission and reception with the CSBS is possible; and transmitting the illegal mobile equipment access alarm file in a case where message transmission and reception is possible.

Preferably, said transmitting the illegal mobile equipment access alarm file in a case where message transmission and reception is possible includes: transmitting illegal mobile equipment access alarm report message including high rank system identification information to the CSBS; receiving illegal mobile equipment access alarm report ready message, including file transmission information, from the CSBS; transmitting the illegal mobile equipment access alarm file to the CSBS using the file transmission information; and when transmission of the illegal mobile equipment access alarm file is completed, transmitting illegal mobile equipment access alarm report completion message to the CSBS and receiving illegal mobile equipment access alarm report response message from the CSBS.

Preferably, the file transmission information includes: account for file transmission, password for account and directory where file will be stored.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

Figure 1:
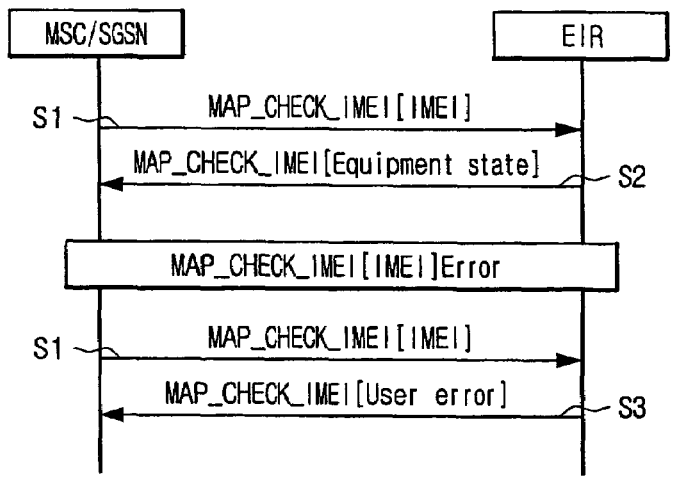
FIG. 1 illustrates MAP protocol message furnishing procedure performed by a related art system.

According to at least one embodiment of the present invention, IMSI and MSISDN information of mobile equipment user are added to a MAP protocol message used when a switching system MSC/SGSN requests an EIR to notify service grade of IMEI. The IMSI and MSISDN information is added based on information stored in a database relating to mobile equipment and mobile equipment subscribers. In accordance with at least one embodiment, the EIR may be used in providing a security service in a communications network corresponding to or included as part of a mobile communications system. In a case where the IMEI is an IMEI of illegal mobile equipment as a result checking the EIR, IMSI and MSISDN information of the mobile equipment user is stored in database or file and the EIR transmits an illegal mobile equipment access notification message to administration system.

The IMSI information preferably includes mobile subscriber identification information, which may include one or more of Mobile Country Code (MCC), Mobile Network Code (MNC) and Mobile Subscriber Identification Number (MSIN). The MSISDN information preferably includes ISDN identification information which is used by mobile subscriber. The ISDN identification information may include one or more of Country Code (CC), National Destination Number (NDN), and Subscriber Number (SN) information.

A preferred configuration of a MAP_CHECK_IMEI protocol message including the IMSI and MSISDN information is shown in TABLE 2.

TABLE 2

| Parameter name | Request | Indication | Response | Confirm |
|---|---|---|---|---|
| Invoke id | M | M(=) | M(=) | M(=) |
| IMEI | C | C(=) | C | C(=) |
| IMSI | C | C(=) | | |
| MSISDN | C | C(=) | | |

TABLE 2-continued

| Parameter name | Request | Indication | Response | Confirm |
|---|---|---|---|---|
| Equipment | | | C | C(=) |
| User error | | | C | C(=) |
| Provider error | | | | O |

In this table, M is a necessary parameter, C is a selective parameter, O is a selective parameter of service operator, and (=) indicates that the parameter has a same value.

A preferred configuration of a user information database managed by the EIR is shown in TABLE 3.

TABLE 3

| Record name | Meaning |
|---|---|
| IMEI | Identification information of mobile equipment |
| IMSI | Identification information of mobile equipment user |
| ME TYPE | Type information of mobile equipment |
| ME PHYSICAL | Physical status of mobile equipment |
| ME SERVICE | Service grade of mobile equipment |
| ME REGISTATION | First registration time of mobile equipment |
| OTHER INFO | Other information (name, address, contact, etc.) |
| ACCESS IMSI [1..N] | Mobile equipment user IMSI information [1..N] |
| NODE_INFORMATION [1..N] | Network node information [1..N] Access time information [1..N] |
| ACCESS MSISDN [1..N] | Mobile equipment user MSISDN information [1..N] |
| [1..N] | Network node information [1..N] |
| NODE INFORMATI | Access time information [1..N] |

A preferred embodiment of structure of a file in an EIR storing illegal mobile equipment usage information is shown in TABLE 4.

TABLE 4

[17:44:04, cim.c( 675)]
[17:44:04, cim.c( 676)] Access time: Tue May 21 17:44:04
[17:44:04, cim.c( 679)] IMEI = 1020304050607080
[17:44:04, cim.c( 680)] IMSI = 450081034381003
[17:44:04, cim.c( 688)] Access IMSI = 450081034381000
[17:44:04, cim.c( 689)] Node Type = SGSN
[17:44:04, cim.c( 692)] ISDN Number = 1039460300
. . .
. . .
[17:44:04, cim.c( 720)]

The file information may be encrypted for security or stored in the format of ASCII file or binary. Information stored in the file and the order of the information may be changed.

Figure 2:
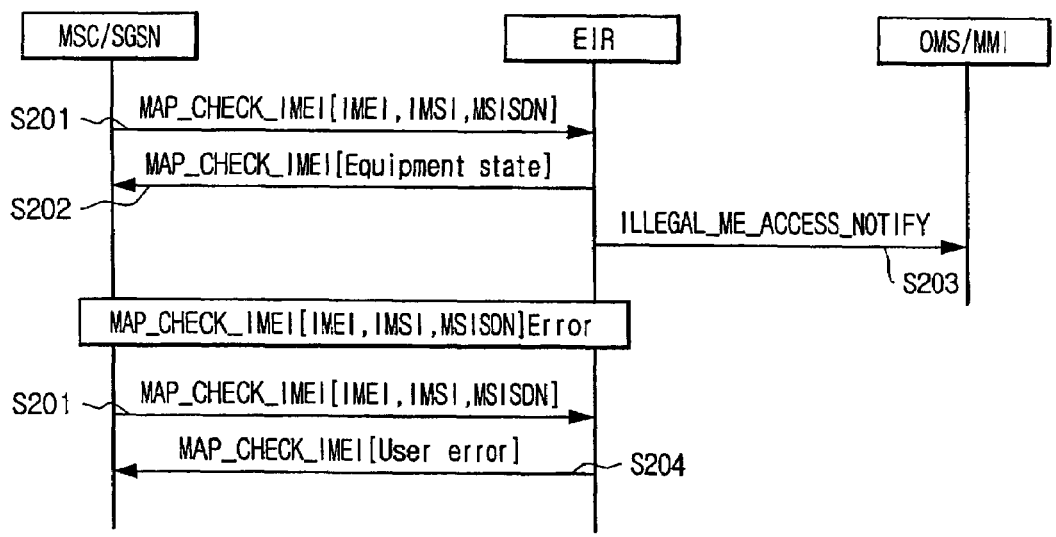
FIG. 2 illustrates flows of MAP protocol message according to a preferred embodiment of the present invention.

FIG. 2 illustrates flows of a MAP protocol message according to a preferred embodiment of the present invention.

Initially, the MSC/SGSN transmits a MAP_CHECK_IMEI [IMEI, IMSI, MSISDN] request message including IMSI and MSISDN information of a mobile equipment user as well as IMEI information to EIR, when requesting an IMEI service grade of mobile equipment (S201).

The EIR checks whether an error exists in MAP_CHECK_IMEI [IMEI, IMSI, MSISDN] request message transmitted from MSC/SGSN. When no error exists, the EIR inquires a service grade of IMEI by retrieving information from the database of TABLE 3. Then, the EIR transmits MAP_CHECK_IMEI [Equipment status] response message keeping the inquired service grade in the equipment status parameter to the MSC/SGSN (S202).

When a service grade of the IMEI is classified into a black list as a result of inquiry performed by the database information retrieval step, the EIR updates the database using information included in a MAP_CHECK_IMEI [IMEI, IMSI, MSISDN] request message received from the MSC/SGSN. Then, the EIR transmits illegal mobile equipment access notification message (ILLEGAL_ME_ACCESS_NOTIFY message) notifying Operations and Maintenance System (OMS)/Man Machine Interface (MMI), an administration system of EIR, of trial of using illegal mobile equipment to OMS/MMI (S203).

When an error exists in the MAP_CHECK_IMEI [IMEI, IMSI, MSISDN] request message transmitted from MSC/SGSN, the EIR transmits a MAP_CHECK_IMEI [User error] message, an error message, to the MSC/SGSN (S204).

Figure 3:
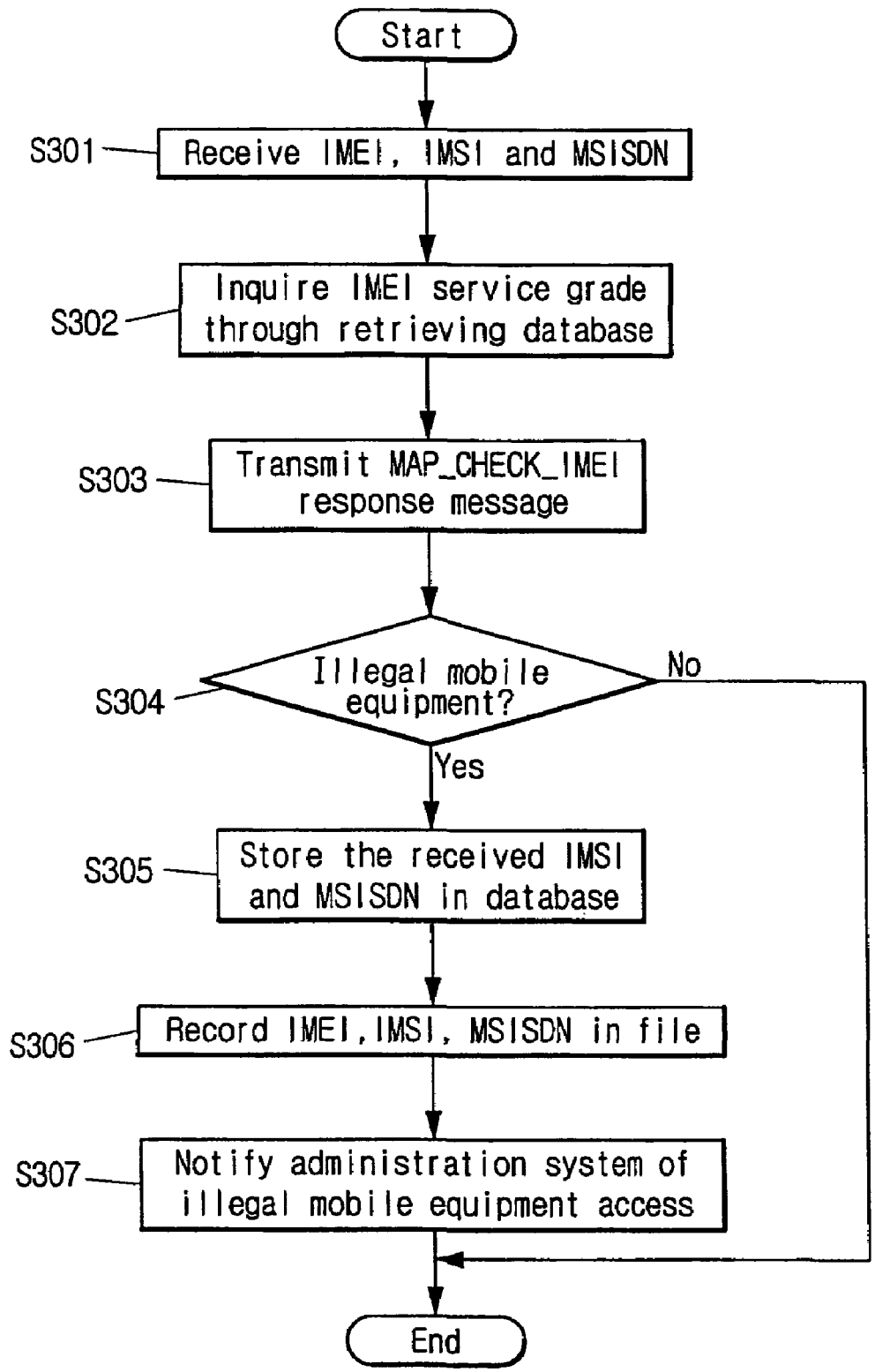
FIG. 3 illustrates a procedure of furnishing administration system with illegal mobile equipment user information according to the preferred embodiment of the present invention.
Figure 4:
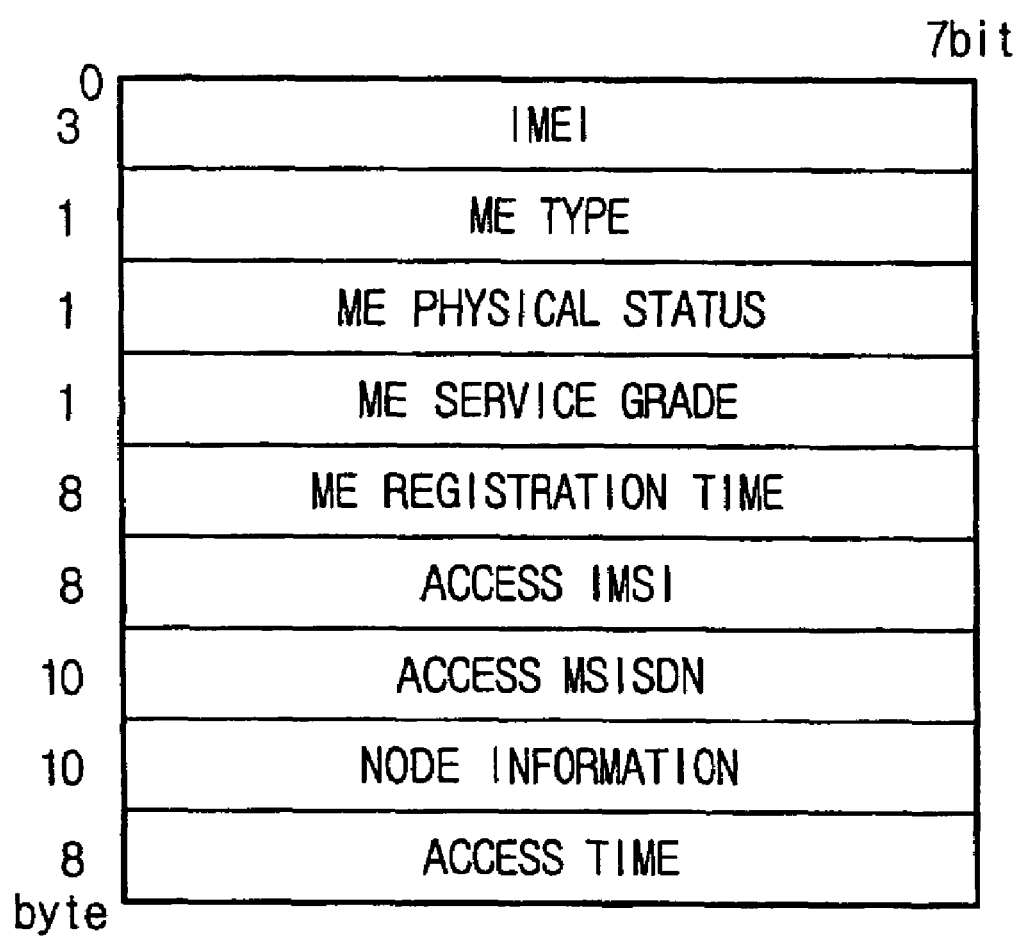
FIG. 4 illustrates configuration of illegal mobile equipment access alarm message according to another preferred embodiment of the present invention.

FIG. 3 illustrates a procedure of furnishing administration system with illegal mobile equipment user information according to the preferred embodiment of the present invention. Initially, the EIR, that received MAP_CHECK_IMSI [IMEI, IMSI, MSISDN] request message including the IMSI and MSISDN information of mobile equipment user from the MSC/SGSN (S301), inquires of a service grade of the IMEI through retrieving information from the database of Table 3 (S302).

The EIR transmits a MAP_CHECK_IMEI [Equipment status] response message keeping the inquired service grade in the equipment status parameter to the MSC/SGSN (S303).

As a result of the database inquiry, in a case where the service grade of the IMEI is classified into black list (that is, mobile equipment corresponding to the IMEI is checked to be stolen, lost or illegally duplicated) (S304), the EIR updates the mobile equipment user information (ACCESS IMSI related information and ACCESS MSISDN related information) in records of the database of Table 3 with reference to user information included in the MAP_CHECK_IMEI [IMEI, IMSI, MSISDN] request message received from the MSC/SGSN (S305).

The EIR records information included in the MAP_CHECK_IMEI [IMEI, IMSI, MSISDN] request message transmitted from the MSC/SGSN in illegal mobile equipment user information file (S306) and notifies the OMS/MMI of the illegal mobile equipment access (S307).

Accordingly, an operator may be aware of who used the illegal mobile equipment (Access IMSI), when the illegal mobile equipment is used (Access time) and how the illegal mobile equipment is used (Node Type, ISDN Number).

According to another embodiment of the present invention, the EIR notifies the CSBS of an illegal mobile equipment access through an illegal mobile equipment access alarm message (ILLEGAL_ME_ACCESS_ALARM) (Hereinafter, alarm message) and an illegal mobile equipment usage alarm file (Hereinafter, alarm file).

The CSBS is located in one area of communication network, unlike the OMS which may be distributed through several areas in the communication network. A preferred configuration of the alarm message is illustrated in Table 4 and an information field of the alarm field is described in the TABLE 5.

TABLE 5

| | |
|---|---|
| IMEI | IMEI information of mobile equipment |
| ME TYPE | Type of mobile equipment |
| ME PHYSICAL | Physical status of mobile equipment |
| ME SERVICE | Service grade (White/Black/Gray) of mobile equipment |
| ME | First registration time of mobile equipment |
| ACCESS IMSI | IMSI information of mobile equipment |
| ACCESS MSISDN | MSISDN number information of mobile equipment |
| NODE | MSC or SGSN information |
| ACCESS TIME | Mobile equipment usage time |

Figure 5:
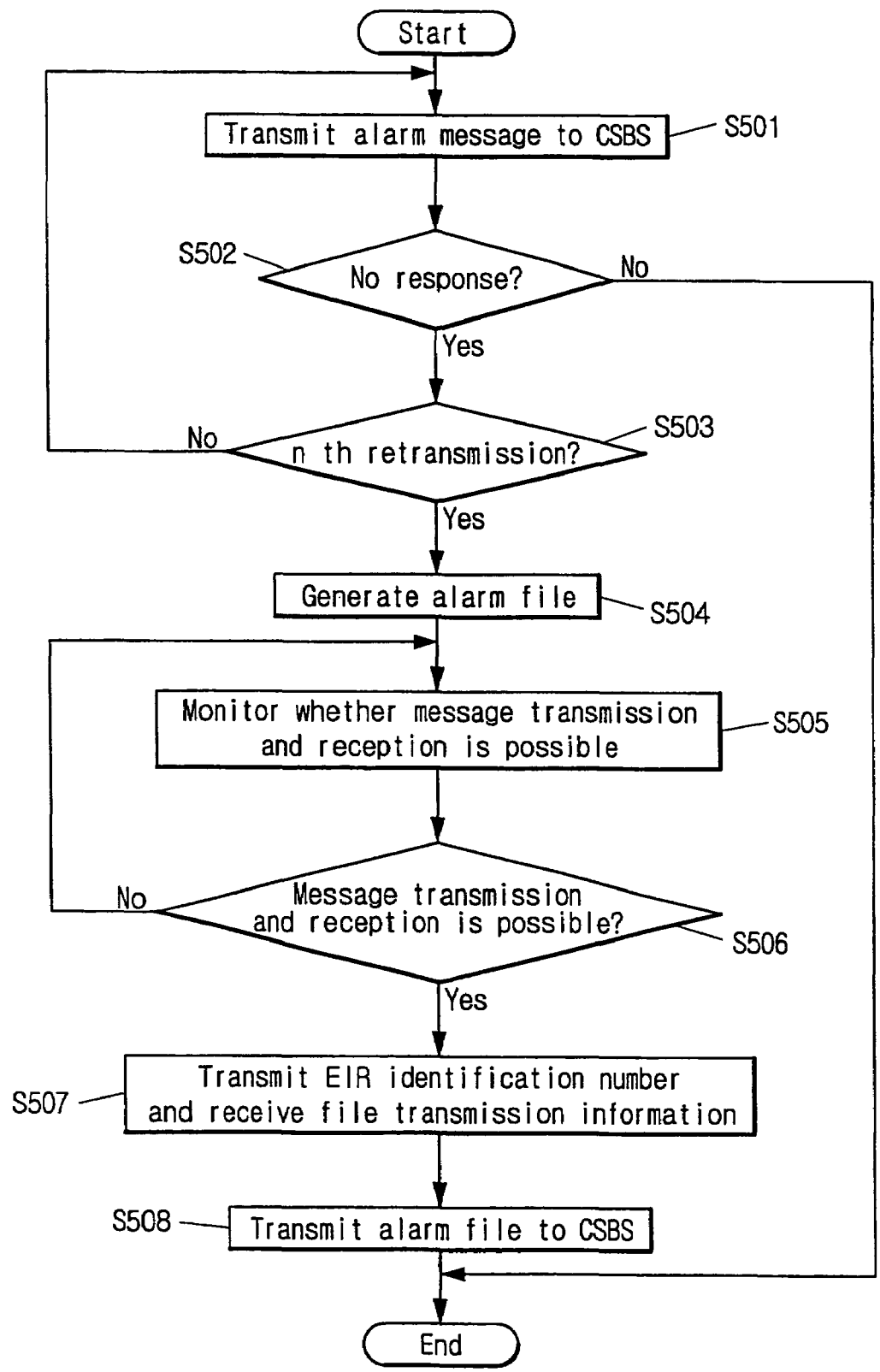
FIG. 5 illustrates procedure of furnishing illegal mobile equipment user information according to another preferred embodiment of the present invention.

FIG. 5 illustrates a procedure of furnishing illegal mobile equipment user information according to another embodiment of the present invention. Initially, the EIR generates an alarm message (ILLEGAL_ME_ACCESS_ALARM) using illegal mobile equipment user information received from the MSC/SGSN and transmits the alarm message to the CSBS (S501). When no response is received from the CSBS within a certain time, the EIR retransmits the alarm message to the CSBS (S502, S503).

When retransmission of the alarm message fails, the EIR stops an instant report trial by the alarm message and generates the alarm file using illegal mobile equipment user information (S504).

Then, the EIR monitors the status of the CSBS, as to whether message transmission and reception between the EIR and CSBS is possible (S505). As a result of this monitoring step, when message transmission and reception is possible, the EIR transmits an EIR identification number identifying the EIR to CSBS and receives file transmission information, such as an account for file transmission, a password for the account and a directory where the file will be stored, from the CSBS (S506, S507). Then, the EIR transmits the alarm file to the CSBS using the file transmission information.

Through the above procedure, the EIR instantly reports illegal mobile equipment user information to CSBS through alarm message and reports illegal mobile equipment user information to CSBS through alarm file. This may occur either periodically or when there is a failure in reporting the illegal mobile equipment user information through the alarm message.

Figure 6:
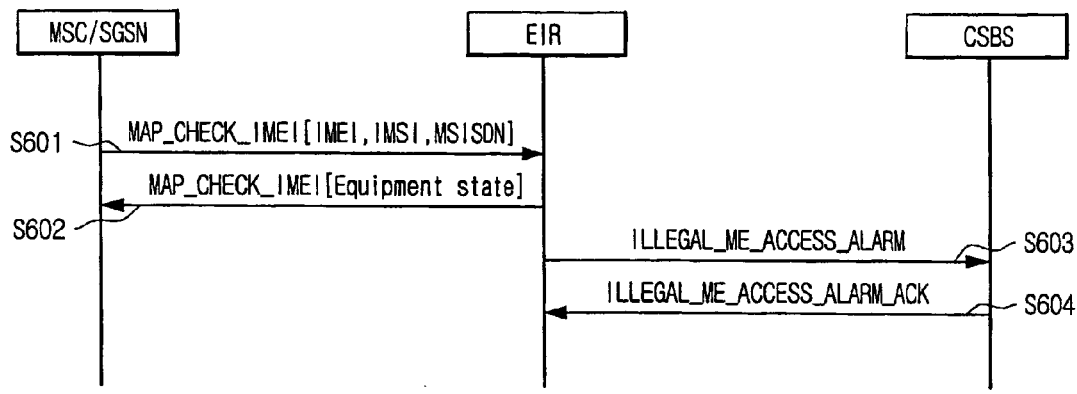
FIG. 6 illustrates flows of message for furnishing CSBS with illegal mobile equipment user information according to another preferred embodiment of the present invention.
Figure 7:
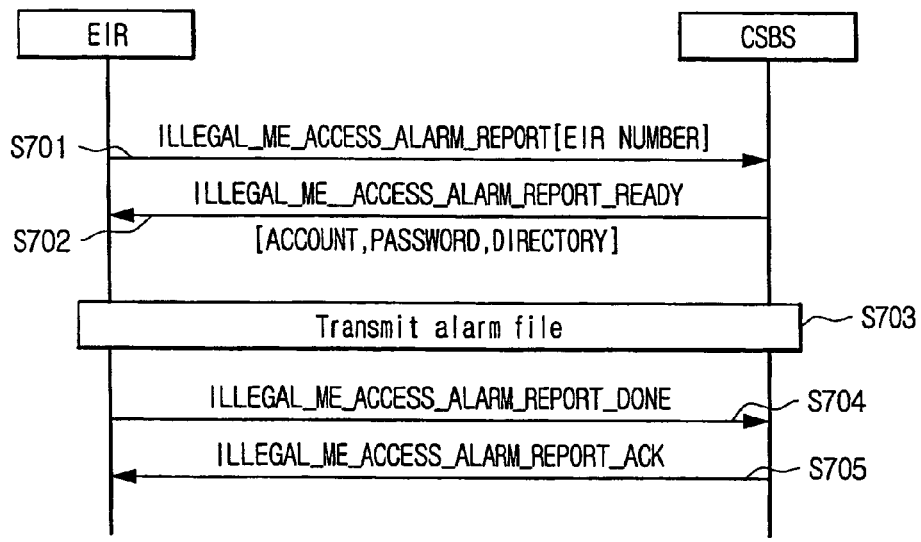
FIG. 7 illustrates flows of message for furnishing CSBS with illegal mobile equipment user information in a file format.

FIG. 6 illustrates flows of message for furnishing CSBS with illegal mobile equipment user information according to another embodiment of the present invention. Initially, the EIR receives MAP_CHECK_IMEI [IMEI, IMSI, MSISDN] request message including IMSI and MSISDN information from MSC/SGSN (S601). Then, by inquiring of a service grade of the IMEI through retrieving database in the EIR, the EIR transmits a MAP_CHECK_IMEI [Equipment status] response message keeping the checked service grade in an equipment status parameter to the MSC/SGSN (S602).

As a result of the database inquiry, when a service grade of the IMEI is classified into a black list, the EIR transmits an alarm message including illegal mobile equipment user information, information included in MAP_CHECK_IMEI [IMEI, IMSI, MSISDN] request message received from MSC/SGSN, to the CSBS (S603) and the EIR receives a response message from the CSBS that received the alarm message (S604).

The EIR that received the alarm message operates a transmission timer. When a response message is not received from the CSBS within a certain time, the EIR initializes the transmission timer. The EIR then transmits the alarm message to the CSBS again.

The alarm message is retransmitted to the CSBS preferably according to a retransmission number designated by operator. For instance, in a case where the retransmission number is N=1, retransmission is performed once. In a case where a response is not received from the CSBS after performing retransmission as many times as the retransmission number, the EIR stops an instant report through an alarm message and stores illegal mobile equipment user information, included in alarm message, in an alarm file. Then, the EIR monitors status of the CSBS.

As a result of this monitoring step, when the message transmission and reception is possible, the EIR transmits the alarm file to the CSBS. More specifically, the EIR transmits an alarm report message (ILLEGAL_ME_ACCESS_ALARM_REPORT) including an EIR identification number to the CSBS (S701).

Then, the EIR receives an alarm report ready message (ILLEGAL_ME_ACCESS_ALARM_REPORT_READY) including alarm file transmission information, such as an account for file transmission, password for the account and a directory where file will be stored, from the CSBS (S702).

Then, the EIR transmits, using the received alarm file transmission information, the alarm file including illegal mobile equipment user information to the CSBS (S703). At this time, a File Transfer Protocol (FTP) or Trivial File Transfer Protocol (TFTP), Transmission Control Protocol (TCP)/Internet Protocol (IP) application protocol, File Transfer Access and Management (FTAM), Open System Interconnection (OSI) application protocol or other file transmission protocol may be used.

If transmission of the alarm file is completed, the EIR that transmitted the alarm file using file transmission protocol notifies the CSBS of completion of the alarm file transmission by transmitting an alarm report completion message (ILLEGAL_ME_ACCESS_ALARM_REPORT_DONE) to the CSBS (S704).

Then, the EIR receives an alarm report response message (ILLEGAL_ME_ACCESS_ALARM_REPORT_ACK) from the CSBS (S705) and an illegal mobile equipment access reporting procedure using alarm file is completed.

The file transmission procedure may be performed in a normal condition periodically as well as in a condition that message transmission and reception between the EIR and CSBS is abnormal, and an instant report and file transmission may be performed at the same time.

The present teaching can be readily applied to other types of systems and methods. The description of the present invention is intended to be illustrative, and not to limit the scope of the claims. Many alternatives, modifications and variations will be apparent to those skilled in the art.

Especially, higher rank systems other than a switching system, for instance, an AUC may set up the mobile equipment user information database by performing as security furnishing functions, and a MAP_CHECK_IMEI may be transmitted from switching system and processed on the basis of the database. In this case, illegal mobile equipment user information may be furnished by the AUC.

As above described, the present invention adds mobile equipment user information to a MAP protocol message checking an IMEI service grade. Thus, usage of illegal mobile equipment may be prohibited and a trace of illegal mobile equipment becomes much easier by storing useful information such as illegal mobile equipment user, using time or etc. and managing the information. Further, a mobile communication carrier may flexibly deal with illegal mobile equipment, so that competitiveness of goods is heightened and high quality service may be furnished.

Furthermore, according to the present invention, a security furnishing means, such as an EIR or AUC, that detects illegal mobile equipment usage transmits illegal mobile equipment user information to the CSBS, so that immediacy of information may be assured, operator tasks may be reduced, and information may be managed effectively by a centralized CSBS.

Especially, because illegal mobile equipment user information is reported to the CSBS as soon as the illegal mobile equipment is used, an operator may notify the illegal mobile equipment user instantly that the mobile equipment is illegal mobile equipment and prevents mobile subscriber from using illegal mobile equipment in advance by taking proper steps.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of furnishing illegal mobile equipment user information, comprising:
   obtaining mobile equipment user information through a service grade inquiry at a security furnishing system that received a request for service grade of mobile equipment from a switching system, said obtaining including receiving, in the security furnishing system, a mobile application part (MAP) protocol message that includes International Mobile Station Identity (IMSI) information and Mobile Subscriber Integrated Service Digital Network (MSISDN) information;
   searching a database in response to the request to determine that the mobile equipment user information is illegal;
   storing the IMSI and MSISDN information received in the MAP protocol message corresponding to the mobile equipment user information; and
   reporting the illegal mobile equipment user information to a system operator.

2. The method of claim 1, wherein the MAP protocol message is received with International Mobile Equipment Identity (IMEI) information, and wherein the mobile equipment user information is determined to be illegal by searching the database for the IMEI information.

3. The method of claim 2, wherein the method further includes storing in the database the IMEI information, a type of mobile equipment, a physical status of mobile equipment, a service grade of mobile equipment, a first registration time of mobile equipment, an access IMSI, an access MSISDN, a node information, and access time information.

4. The method of claim 2, further comprising:
   when the service grade is classified as an illegal IMEI, recording the mobile equipment user information in an illegal mobile equipment user file.

5. The method of claim 2, further comprising:
   reporting the mobile equipment user information to an operator through an administration system which administrates the switching system.

6. The method of claim 1, wherein the security furnishing system includes an Equipment Identity Register (EIR) or an Authentication Center (AUC) furnishing security service.

7. A method of furnishing illegal mobile equipment user information, comprising:
 obtaining mobile equipment user information through a service grade inquiry at a security furnishing system, said obtaining including receiving, in the security furnishing system, a mobile application part (MAP) protocol message that includes International Mobile Station Identity (IMSI) information and Mobile Subscriber Integrated Service Digital Network (MSISDN) information;
 searching a database in response to the request to determine that the mobile equipment user information is illegal;
 storing the IMSI and MSISDN information received in the MAP protocol message corresponding to the mobile equipment user information; and
 reporting the illegal mobile equipment user information to an operator through a Customer Service Billing System (CSBS) which manages a mobile communication network service subscriber.

8. The method of claim 7, wherein reporting the illegal equipment user information to an operator through the CSBS comprises:
 generating an illegal mobile equipment access alarm message using the mobile equipment user information; and
 transmitting the illegal mobile equipment access alarm message to the CSBS.

9. The method of claim 8, wherein the illegal mobile equipment access alarm message comprises an IMEI, a type of mobile equipment, a physical status of mobile equipment, a service grade of mobile equipment, a first registration time of mobile equipment, an access IMSI, an access MSISDN, node information, and access time information.

10. The method of claim 8, wherein reporting the information to the operator through the CSBS further comprises:
 when transmission of the illegal mobile equipment access alarm message fails, transmitting illegal mobile equipment access alarm file to the CSBS.

11. The method of claim 10, wherein the illegal mobile equipment access alarm file includes an IMEI, a type of mobile equipment, a physical status of mobile equipment, a service grade of mobile equipment, a first registration time of mobile equipment, an access IMSI, an access MSISDN, node information, and access time information.

12. The method of claim 10, wherein when transmission of the illegal mobile equipment access alarm message fails, transmitting the illegal mobile equipment access alarm file to the CSBS comprises:
 generating the illegal mobile equipment access alarm file using the mobile equipment user information;
 monitoring whether or not message transmission and reception with the CSBS is possible; and
 transmitting the illegal mobile equipment access alarm file when message transmission and reception is possible.

13. The method of claim 12, wherein transmitting the illegal mobile equipment access alarm file when message transmission and reception is possible comprises:
 transmitting an illegal mobile equipment access alarm report message including a high-rank system identification information to the CSBS;
 receiving an illegal mobile equipment access alarm report ready message, including file transmission information, from the CSBS;
 transmitting the illegal mobile equipment access alarm file to the CSBS using the file transmission information; and
 when transmission of the illegal mobile equipment access alarm file is completed, transmitting an illegal mobile equipment access alarm report completion message to the CSBS and receiving illegal mobile equipment access alarm report response message from the CSBS.

14. The method of claim 13, wherein the file transmission information comprises: account for file transmission, password for account, and directory where the file will be stored.

15. A method of furnishing illegal mobile equipment user information, comprising:
 transmitting an International Mobile Equipment Identity (IMEI) request message including an IMEI and user information of mobile equipment from a switching system to a security furnishing system, the mobile equipment user information including IMEI information, International Mobile Station Identity (IMSI) information and Mobile Subscriber Integrated Service Digital Network (MSISDN) information;
 inquiring of a service grade of the IMEI by searching a retrieving user information database at the security furnishing system;
 transmitting an IMBI response message indicative of the service grade to the switching system; and
 when the service grade is classified as an illegal IMEI, storing the IMSI and MSISDN included in the IMEI request message mobile equipment user information in the user information database and reporting a notification message to an operator.

16. The method of claim 15, wherein the user information database is accessible by an Equipment Identity Register (EIR) or an Authentication Center (AUC) furnishing security service.

17. The method of claim 15, wherein the user information database stores the IMEI and the following related information: a type of mobile equipment, a physical status of mobile equipment, a service grade of mobile equipment, a first registration time of mobile equipment, an access IMSI, an access MSISDN, node information, and access time information.

18. The method of claim 15, wherein the notification message is reported to the operator through an administration system which administrates the switching system.

19. A method of furnishing illegal mobile equipment user information comprising:
 transmitting an IMEI request message including an IMEI and user information of mobile equipment from a switching system to a security furnishing system, the mobile equipment user information including IMEI information, International Mobile Station Identity (IMSI) information and Mobile Subscriber Integrated Service Digital Network (MSISDN) information:
 inquiring of a service grade of the IMEI by searching a user information database at the security furnishing system;
 transmitting an IMEI response message indicative of the service grade to the switching system; and
 when the service grade is classified as an illegal IMEI, storing the IMSI and MSISDN included in the IMEI request message in the user information database and sending an access alarm message to an operator through a Customer Service Billing System (CSBS) managing mobile communication network service subscriber.

20. The method of claim 19, wherein the access alarm message comprises the IMEI information, a type of mobile equipment, a physical status of mobile equipment, a service grade of mobile equipment, a first registration time of mobile equipment, an access IMSI, an access MSISDN, node information, and access time information.

21. The method of claim 19, wherein, when transmission of the access alarm message fails, transmitting an illegal mobile equipment access alarm file to the CSBS.

22. The method of claim 21, wherein the illegal mobile equipment access alarm file includes the IMEI information, a type of mobile equipment, a physical status of mobile equipment, a service grade of mobile equipment, a first generation time of mobile equipment, an access IMSI, an access MSISDN, a node information, and access time information.

23. The method of claim 21, wherein when transmission of the access alarm message fails, the method further comprises:

generating the alarm file based on the mobile equipment user information;

monitoring whether or not message transmission and reception with the CSBS is possible; and transmitting the access alarm file in a case where message transmission and reception is possible.

24. The method of claim 23, wherein transmitting the access alarm file when message transmission and reception is possible comprises:

transmitting an illegal mobile equipment access alarm report message including a high rank system identification information to the CSBS;

receiving an illegal mobile equipment access alarm report ready message, including file transmission information, from the CSBS;

transmitting the illegal mobile equipment access alarm file to the CSBS using the file transmission information; and when transmission of the illegal mobile equipment access alarm file is completed, transmitting an illegal mobile equipment access alarm report completion message to the CSBS and receiving illegal mobile equipment access alarm report response message from the CSBS.

25. The method of claim 24, wherein the file transmission information comprises: account for file transmission, password for account, and directory where file is stored.

* * * * *